(12) United States Patent
Liu

(10) Patent No.: US 7,163,320 B2
(45) Date of Patent: Jan. 16, 2007

(54) GRILLE HAVING LIGHT EMITTING EFFECT

(76) Inventor: Yao-Huang Liu, 58, Ma Yuan West St., Taichung (TW)

( * ) Notice: Subject to any disclaimer, the term of this patent is extended or adjusted under 35 U.S.C. 154(b) by 126 days.

(21) Appl. No.: 10/998,250

(22) Filed: Nov. 29, 2004

(65) Prior Publication Data

US 2006/0114686 A1    Jun. 1, 2006

(51) Int. Cl.
    *B60Q 1/28* (2006.01)
(52) U.S. Cl. .......................................... 362/469; 362/540
(58) Field of Classification Search ................ 362/496, 362/509, 234, 235, 241, 502, 247, 297, 348, 362/545, 540, 543, 548, 549, 800, 479; 340/468, 340/471, 472; 40/204–206, 208–210
    See application file for complete search history.

(56) References Cited

U.S. PATENT DOCUMENTS

| | | | | |
|---|---|---|---|---|
| 1,998,680 A | * | 4/1935 | Lint | 362/502 |
| 2,403,856 A | * | 7/1946 | Andrade | 362/502 |
| 4,791,402 A | * | 12/1988 | Vaughn | 340/468 |
| 4,862,330 A | * | 8/1989 | Machida et al. | 362/522 |
| 4,920,460 A | * | 4/1990 | Mori | 362/496 |
| 5,373,426 A | * | 12/1994 | O'Sullivan | 362/496 |
| 6,773,150 B1 | * | 8/2004 | Giordani et al. | 362/518 |
| 6,986,597 B1 | * | 1/2006 | Elwell | 362/496 |
| 2005/0218243 A1 | * | 10/2005 | Zobele et al. | 239/34 |

* cited by examiner

*Primary Examiner*—Sandra O'Shea
*Assistant Examiner*—Bao Q. Truong
(74) *Attorney, Agent, or Firm*—Alan D. Kamrath; Nikolai & Mersereau, P.A.

(57) ABSTRACT

A grille for a car grille includes a frame, a filter net mounted on a side of the frame, and a light emitting device mounted between the frame and the filter net. Thus, the arcuate convex faces of the reflective plate of the light emitting device reflect the light rays firm the light emitting members toward the pattern plate, so that the light rays from the light emitting members are projected onto the pattern plate evenly and smoothly, thereby enhancing the outstanding appearance of the grille when the car is driven at the night.

12 Claims, 5 Drawing Sheets

GRILLE HAVING LIGHT EMITTING EFFECT

BACKGROUND OF THE INVENTION

1. Field of the Invention

The present invention relates to a grille for a car, and more particularly to a grille having a light emitting effect.

2. Description of the Related Art

A conventional grille 1 for a car in accordance with the prior art shown in FIG. 5 is mounted on a front side of the car to dissipate the heat from the engine of the car. However, the conventional grille 1 only has a single function, thereby limiting the versatility of the conventional grille 1.

SUMMARY OF THE INVENTION

In accordance with the present invention, there is provided a grille, comprising:

a frame;

a filter net mounted on a side of the frame; and a light emitting device mounted between the frame and the filter net.

The primary objective of the present invention is to provide a grille having a light emitting effect.

Another objective of the present invention is to provide a grille having multiple functions.

A further objective of the present invention is to provide a grille for a car, wherein the arcuate convex faces of the reflective plate of the light emitting device reflect the light rays from the light emitting members toward the pattern plate, so that the light rays from the light emitting members are projected onto the pattern plate evenly and smoothly, thereby enhancing the outstanding appearance of the grille when the car is driven at the night.

A further objective of the present invention is to provide a grille for a car, wherein the filter net is used to filter the air into the engine chamber, thereby providing an air filter effect.

Further benefits and advantages of the present invention will become apparent after a careful reading of the detailed description with appropriate reference to the accompanying drawings.

DETAILED DESCRIPTION OF THE INVENTION

Figure 1:
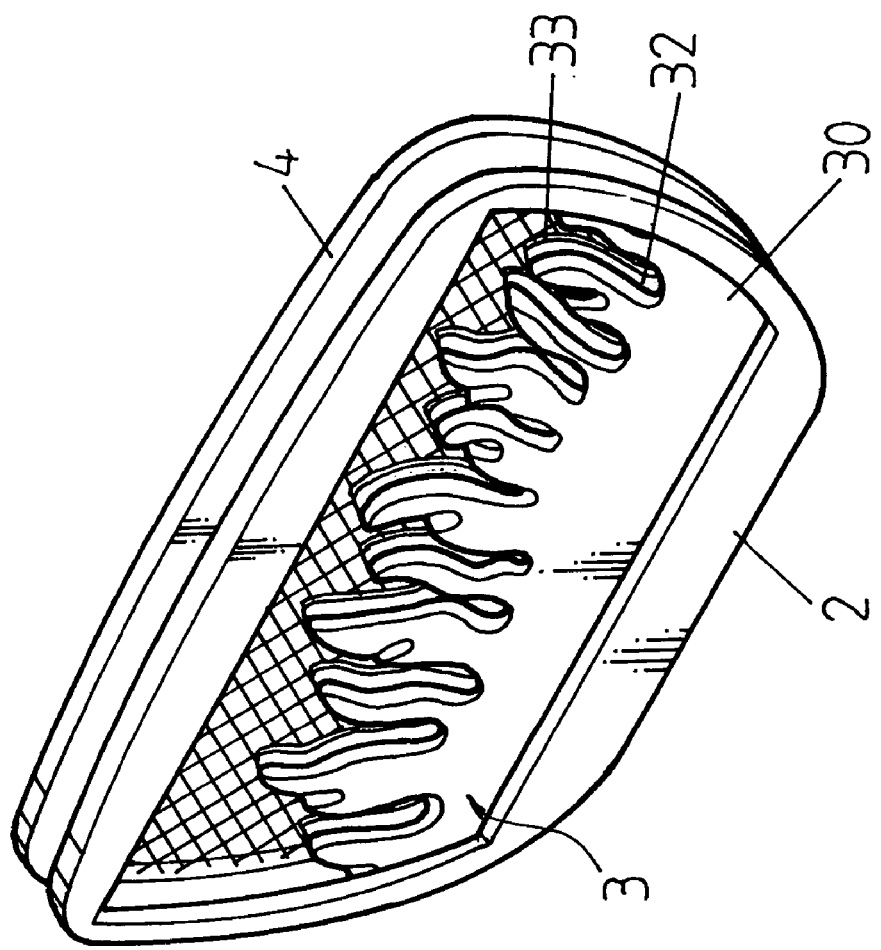
FIG. 1 is a perspective view of a grille in accordance with the preferred embodiment of the present invention.
Figure 2:
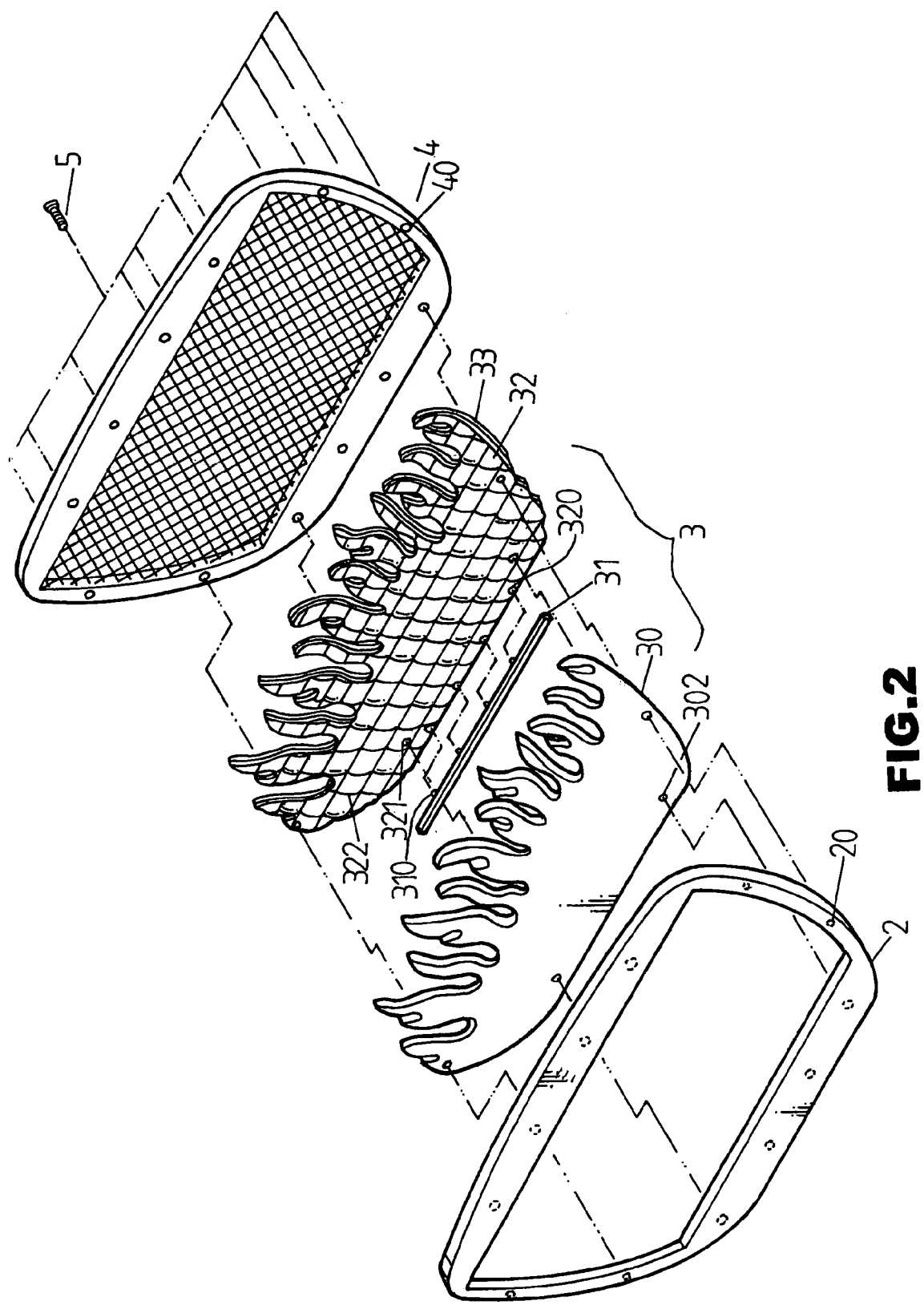
FIG. 2 is an exploded perspective view of the grille as shown in FIG. 1.
Figure 3:
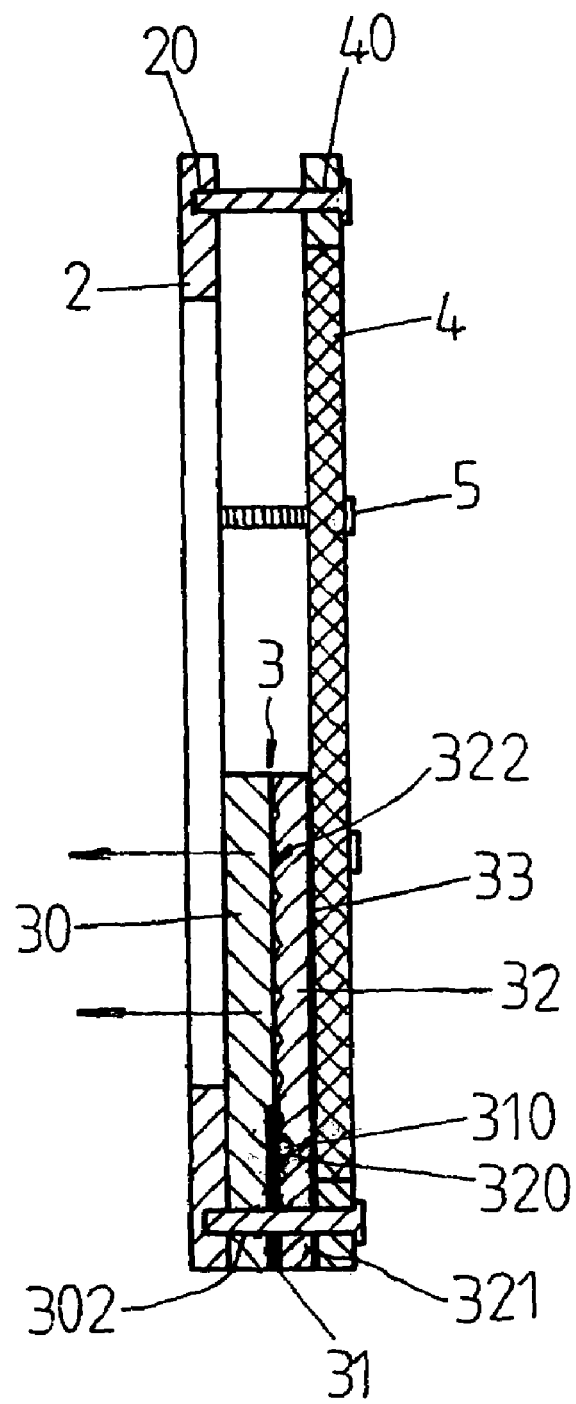
FIG. 3 is a side plan cross-sectional view of the grille as shown in FIG. 1.

Referring to the drawings and initially to FIGS. 1–3, a grille for a car in accordance with the preferred embodiment of the present invention comprises a frame 2, a filter net 4 mounted on a side of the frame 2, and a light emitting device 3 mounted between the frame 2 and the filter net 4.

The frame 2 has a periphery formed with a plurality of screw bores 20.

The light emitting device 3 includes a reflective plate 32, a pattern plate 30, and a circuit board 31 having a plurality of light emitting members 310 (such as light emitting diodes).

The pattern plate 30 of the light emitting device 3 has a periphery formed with a plurality of through holes 302 aligning with the screw bores 20 of the frame 2.

The reflective plate 32 of the light emitting device 3 is located between the frame 2 and the filter net 4, the pattern plate 30 of the light emitting device 3 is a transparent plate located between the frame 2 and the reflective plate 32, and the circuit board 31 of the light emitting device 3 is located between the pattern plate 30 and the reflective plate 32. The reflective plate 32 of the light emitting device 3 has a shape and a size the same as that of the pattern plate 30. The reflective plate 32 of the light emitting device 3 has a periphery formed with a plurality of through holes 321 aligning with the through holes 302 of the pattern plate 30. The reflective plate 32 of the light emitting device 3 has a first side rested on the pattern plate 30 and provided with a plurality of arcuate convex faces 322 directed toward the pattern plate 30. The reflective plate 32 of the light emitting device 3 has a second side rested on the filter net 4 and provided with a reflective sheet 33.

The circuit board 31 of the light emitting device 3 is mounted on a bottom of the reflective plate 32. The bottom of the reflective plate 32 of the light emitting device 3 is formed with a plurality of arcuate recesses 320 to receive the light emitting members 310 of the circuit board 31. The circuit board 31 of the light emitting device 3 has a side directed toward the reflective plate 32 and provided with the light emitting members 310 located between the pattern plate 30 and the reflective plate 32.

The filter net 4 has a shape and a size the same as that of the frame 2. The filter net 4 has a periphery formed with a plurality of through holes 40 aligning with the screw bores 20 of the frame 2.

The frame 2, the light emitting device 3 and the filter net 4 are combined by a plurality of locking screws 5 which are extended through the respective through holes 40 of the filter net 4, the respective through holes 321 of the reflective plate 32 of the light emitting device 3, the respective through holes 302 of the pattern plate 30 of the light emitting device 3, and screwed into the respective screw bores 20 of the frame 2. Thus, the frame 2, the light emitting device 3 and the filter net 4 are combined to form the grille as shown in FIG. 1.

Figure 4:
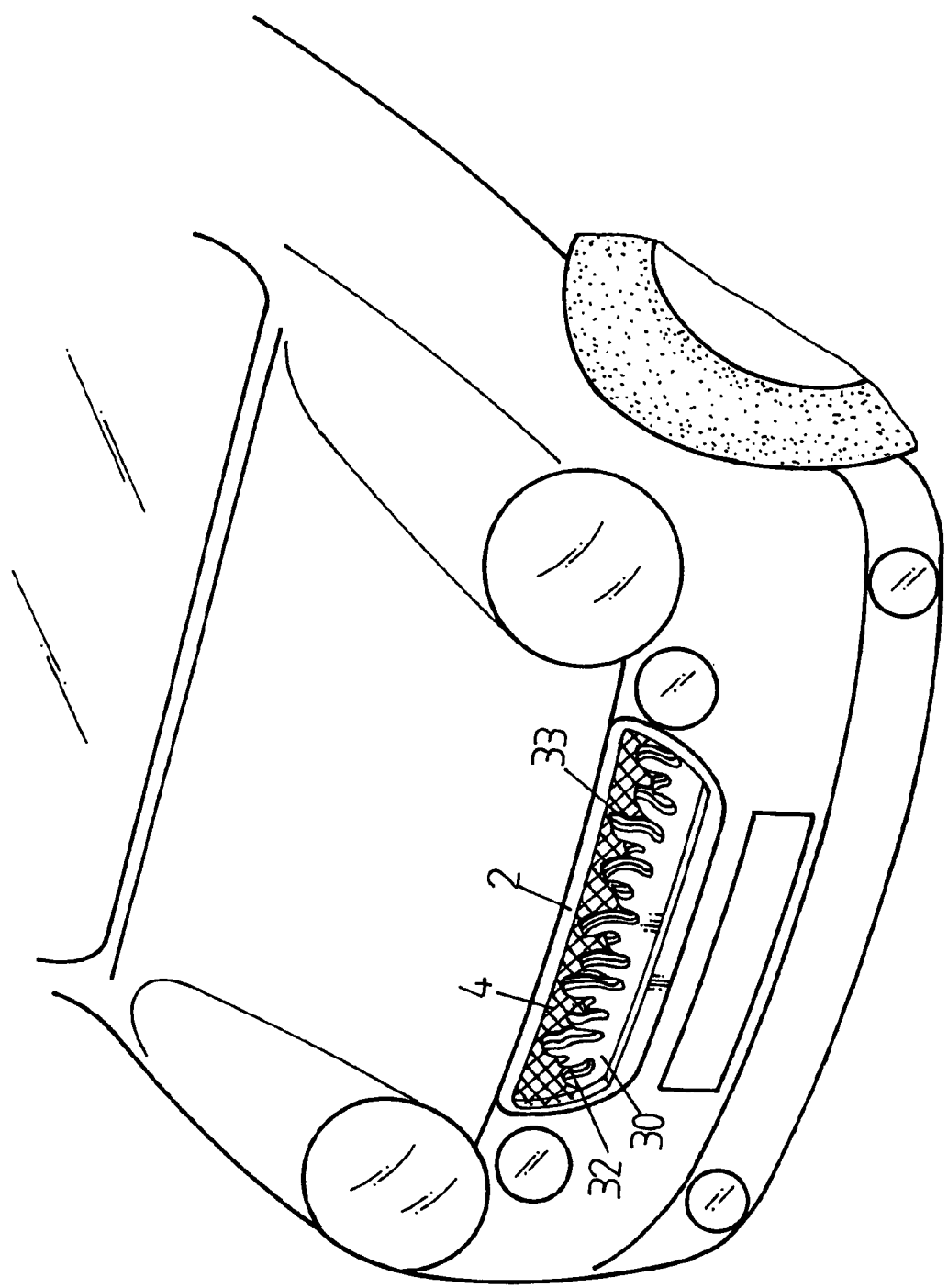
FIG. 4 is a perspective view of the grille for a car as shown in FIG. 1.
Figure 5:
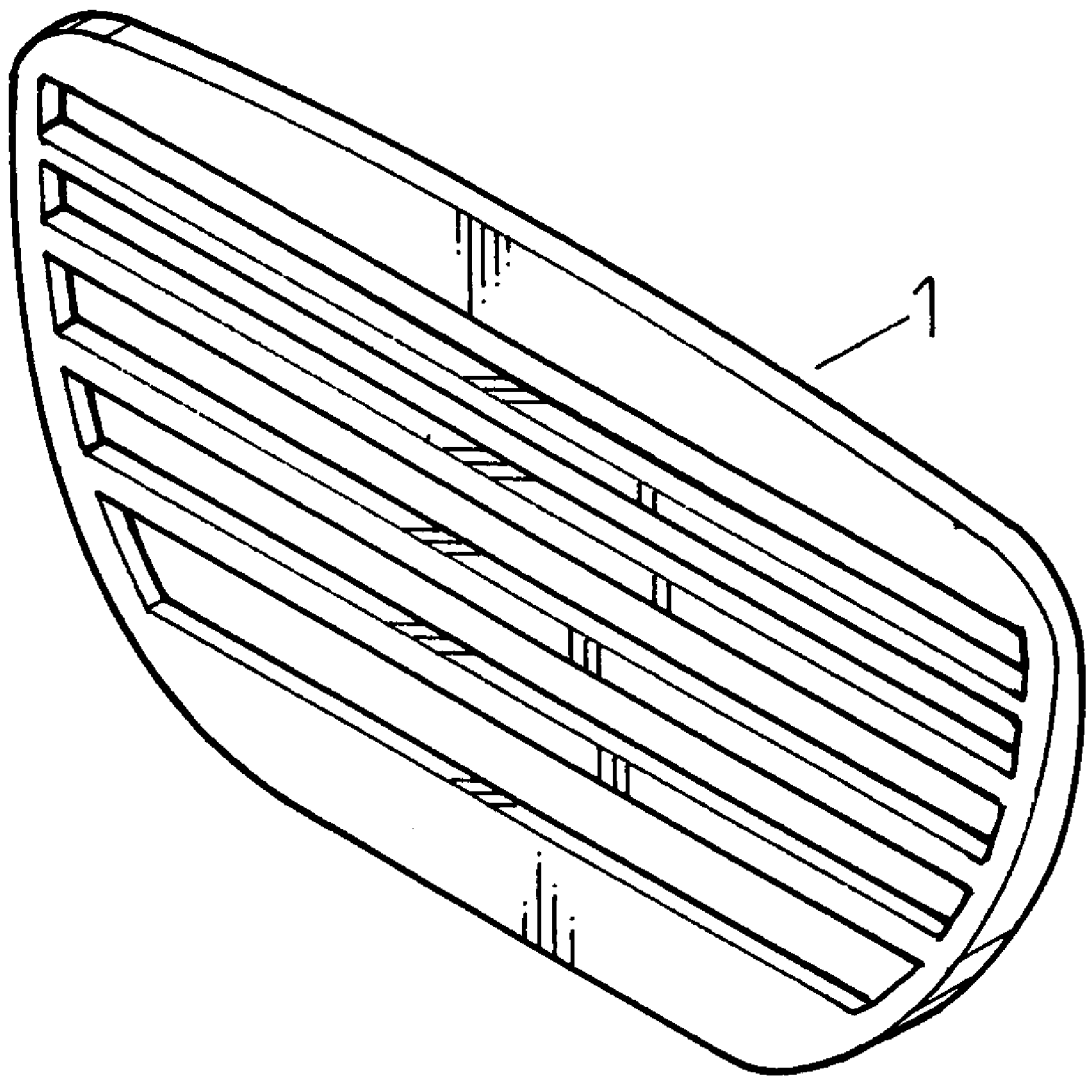
FIG. 5 is a perspective view of a conventional grille for a car in accordance with the prior art.

As shown in FIG. 4, when the grille is mounted on a car, the light emitting device 3 is energized to supply an electric power to the circuit board 31 so that the light emitting members 310 light. At this time, the arcuate convex faces 322 of the reflective plate 32 of the light emitting device 3 reflect the light rays from the light emitting members 310 toward the pattern plate 30, so that the light rays from the light emitting members 310 are projected onto the pattern plate 30 evenly and smoothly, thereby enhancing the outstanding appearance of the grille when the car is driven at the night.

Accordingly, the arcuate convex faces 322 of the reflective plate 32 of the light emitting device 3 reflect the light rays from the light emitting members 310 toward the pattern plate 30, so that the light rays from the light emitting members 310 are projected onto the pattern plate 30 evenly and smoothly, thereby greatly enhancing the outstanding appearance of the grille when the car is driven at the night. In addition, the filter net 4 is used to filter the air into the engine chamber, thereby providing an air filter effect.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A grille for a vehicle, comprising:
   a frame;
   a filter net mounted on a side of the frame; and
   a light emitting device mounted between the frame and the filter net;
   wherein the light emitting device includes a reflective plate, a pattern plate, and a circuit board having a plurality of light emitting members;
   the reflective plate of the light emitting device has a first side rested on the pattern plate and provided with a plurality of arcuate convex faces directed toward the pattern plate;
   the reflective plate of the light emitting device has a second side rested on the filter net and provided with a reflective sheet.

2. The grille in accordance with claim 1, wherein the reflective plate of the light emitting device is located between the frame and the filter net.

3. The grille in accordance with claim 1, wherein the pattern plate of the light emitting device is a transparent plate.

4. The grille in accordance with claim 1, wherein the pattern plate of the light emitting device is located between the frame and the reflective plate.

5. The grille in accordance with claim 1, wherein the circuit board of the light emitting device is located between the pattern plate and the reflective plate.

6. The grille in accordance with claim 1, wherein the reflective plate of the light emitting device has a shape and a size the same as that of the pattern plate.

7. The grille in accordance with claim 1, wherein the arcuate convex faces of the reflective plate of the light emitting device reflect light rays from the light emitting members toward the pattern plate, so that the light rays from the light emitting members are projected onto the pattern plate.

8. The grille in accordance with claim 1, wherein the circuit board of the light emitting device has a side directed toward the reflective plate and provided with the light emitting members located between the pattern plate and the reflective plate.

9. The grille in accordance with claim 1, wherein the filter net has a shape and a size the same as that of the frame.

10. A grille for a vehicle, comnrising:
    a frame;
    a filter net mounted on a side of the frame; and
    a light emitting device mounted between the frame and the filter net;
    wherein the light emitting device includes a reflective plate, a pattern plate, and a circuit board having a plurality of light emitting members;
    the circuit board of the light emitting device is mounted on a bottom of the reflective plate;
    the bottom of the reflective plate of the light emitting device is formed with a plurality of arcuate recesses to receive the light emitting members of the circuit board.

11. A grille for a vehicle comprising:
    a frame;
    a filter net mounted on a side of the frame; and
    a light emitting device mounted between the frame and the filter net;
    wherein the light emitting device includes a reflective plate, a pattern plate, and a circuit board having a plurality of light emitting members;
    the frame has a periphery formed with a plurality of screw bores, the pattern plate of the light emitting device has a periphery formed with a plurality of through holes aligning with the screw bores of the frame, the reflective plate of the light emitting device has a periphery formed with a plurality of through holes aligning with the through holes of the pattern plate, and the filter net has a periphery formed with a plurality of through holes aligning with the screw bores of the frame.

12. The grille in accordance with claim 11, wherein the frame, the light emitting device and the filter net are combined by a plurality of locking screws which are extended through the respective through holes of the filter net, the respective through holes of the reflective plate of the light emitting device, the respective through holes of the pattern plate of the light emitting device, and screwed into the respective screw bores of the frame.

* * * * *